United States Patent
Killalea et al.

(10) Patent No.: US 9,772,737 B1
(45) Date of Patent: Sep. 26, 2017

(54) MANAGING CONTENT ACCESS DATA IN A COMMUNICATION NETWORK

(75) Inventors: Tom Killalea, Seattle, WA (US); Alex T. Rosalez, Woodinville, WA (US); Sean M. Scott, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 13/181,447

(22) Filed: Jul. 12, 2011

Related U.S. Application Data

(60) Provisional application No. 61/480,186, filed on Apr. 28, 2011.

(51) Int. Cl.
*G06F 3/048* (2013.01)

(52) U.S. Cl.
CPC .................... *G06F 3/048* (2013.01)

(58) Field of Classification Search
CPC ............................ G06F 15/0291; G06F 3/048
USPC ......................................................... 715/741
See application file for complete search history.

(56) References Cited

U.S. PATENT DOCUMENTS

| | | | |
|---|---|---|---|
| 5,629,980 A | 5/1997 | Stefik et al. | |
| 5,892,900 A | 4/1999 | Ginter et al. | |
| 6,704,733 B2 | 3/2004 | Clark et al. | |
| 6,912,505 B2 * | 6/2005 | Linden .................. | G06Q 30/02 705/14.53 |
| 7,263,655 B1 | 8/2007 | Carden, Jr. | |
| 7,299,501 B2 | 11/2007 | Hendricks | |
| 7,444,306 B2 | 10/2008 | Varble | |
| 8,271,865 B1 | 9/2012 | Bennett | |
| 8,311,950 B1 * | 11/2012 | Kunal et al. ................... | 705/319 |
| 8,386,601 B1 | 2/2013 | Sutter et al. | |
| 8,543,457 B2 * | 9/2013 | Staib et al. ................. | 705/14.52 |
| 9,069,332 B1 | 6/2015 | Gayles | |
| 2001/0025269 A1 | 9/2001 | Otsuka | |
| 2002/0019763 A1 * | 2/2002 | Linden et al. .................. | 705/10 |
| 2006/0041538 A1 | 2/2006 | King et al. | |
| 2006/0190322 A1 | 8/2006 | Oehlerking et al. | |
| 2007/0005437 A1 * | 1/2007 | Stoppelman ................... | 705/26 |
| 2007/0118802 A1 | 5/2007 | Gerace et al. | |
| 2007/0219863 A1 | 9/2007 | Park et al. | |
| 2007/0255580 A1 | 11/2007 | Cole et al. | |
| 2008/0071561 A1 | 3/2008 | Holcombe | |
| 2008/0082905 A1 | 4/2008 | Martinez et al. | |

(Continued)

*Primary Examiner* — Jeanette J Parker
(74) *Attorney, Agent, or Firm* — Knobbe, Martens, Olson & Bear LLP

(57) ABSTRACT

Systems, methods and interfaces for sharing content access information associated with content among devices in a communication network are provided. One or more devices collect content access information related to the presentation of content to a user on user devices. Based on a determination of a synchronization event, the originating device transmits the collected content access information, resulting in the receipt of the content access information by a content management system. The content management system can process receiving content access information from various devices and user accounts and aggregate the processed content access information into one or more ordered lists. Thereafter, the content management system can publish, or otherwise make available, one or more of the ordered lists to various network resources, originating devices, or other user devices or user accounts.

28 Claims, 12 Drawing Sheets

(56) References Cited

U.S. PATENT DOCUMENTS

| | | |
|---|---|---|
| 2008/0215467 A1 | 9/2008 | Huffman et al. |
| 2008/0243632 A1* | 10/2008 | Kane et al. ............... 705/26 |
| 2008/0257134 A1 | 10/2008 | Oppenhelmer |
| 2009/0006109 A1 | 1/2009 | Martinez et al. |
| 2009/0144283 A1* | 6/2009 | Clark et al. ............... 707/10 |
| 2009/0177583 A1 | 7/2009 | Wen et al. |
| 2010/0011392 A1 | 1/2010 | Bronstein et al. |
| 2010/0077463 A1 | 3/2010 | Rickelton-Abdi |
| 2010/0153411 A1* | 6/2010 | Toebes et al. ............ 707/758 |
| 2010/0205029 A1 | 8/2010 | Asherman et al. |
| 2010/0262515 A1 | 10/2010 | Brewer |
| 2010/0313161 A1* | 12/2010 | Le Chevalier et al. ...... 715/781 |
| 2010/0333021 A1* | 12/2010 | Rafes ..................... 715/810 |
| 2011/0060717 A1* | 3/2011 | Forman et al. ............. 706/54 |
| 2011/0153047 A1 | 6/2011 | Cameron et al. |
| 2011/0153411 A1 | 6/2011 | Levav et al. |
| 2011/0159902 A1* | 6/2011 | Ramer et al. ............... 455/507 |
| 2011/0246632 A1 | 10/2011 | Tran et al. |
| 2011/0289088 A1* | 11/2011 | Yarin et al. ............... 707/738 |
| 2011/0320276 A1* | 12/2011 | Ray .............. G06Q 30/0255 705/14.53 |
| 2012/0084150 A1 | 4/2012 | Nussel et al. |
| 2012/0084282 A1* | 4/2012 | Chiang et al. ............. 707/725 |
| 2012/0131594 A1 | 5/2012 | Morgan |

* cited by examiner

MANAGING CONTENT ACCESS DATA IN A COMMUNICATION NETWORK

CROSS-REFERENCE TO RELATED APPLICATIONS

This application claims the benefit of U.S. Provisional Application No. 61/480,186, entitled "Managing Content Access Data," filed Apr. 28, 2011, the entirety of which is incorporated herein by reference.

BACKGROUND

Generally described, computing devices and communication networks facilitate the collection and exchange of information. In a common application, computing devices, such as personal computing devices, can utilize a wide area communication network, generally referred to as the Internet, to access content, or other data, from other computing devices associated with content providing entities. The specific design/function of each computing device can vary the type of content exchanged between the computing devices.

In one application, various computing devices associated with one or more users or user accounts can access different representations of the content provided by content providing entities. For example, one user may be associated with a wireless computing device corresponding to an electronic book reader ("e-book reader") that has obtained a digital representation of content (e.g., a digital publication that can be presented on an e-book reader) via a communication network (e.g., a wireless communication network). The same user may also be associated with a personal computing device that has obtained a separate representation of the same content (e.g., a copy of the digital publication that can be presented on a display associated with the e-book reader) via the same or a different communication network. Still further, another user may be associated with a digital audio player that has also obtained a separate representation of the same content (e.g., an audio book that can be audibly presented via headphones/speakers) from the same or a different communication network.

Depending on the capabilities and functionality associated with each respective device and the specific nature of the content, a user accesses content via a presentation interface provided, or otherwise associated, with a specific device (e.g., a display on a wireless e-book reader device). In some devices, the user can provide, or associate, additional information with the content, such as annotations, bookmarks, excerpts, etc., during the presentation of the content on a specific device. However, the state/progress of the presentation of the specific representation of the content at one of the specific devices, as well as any additional information provided by the user during the presentation, is not readily provided to other users or user accounts.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
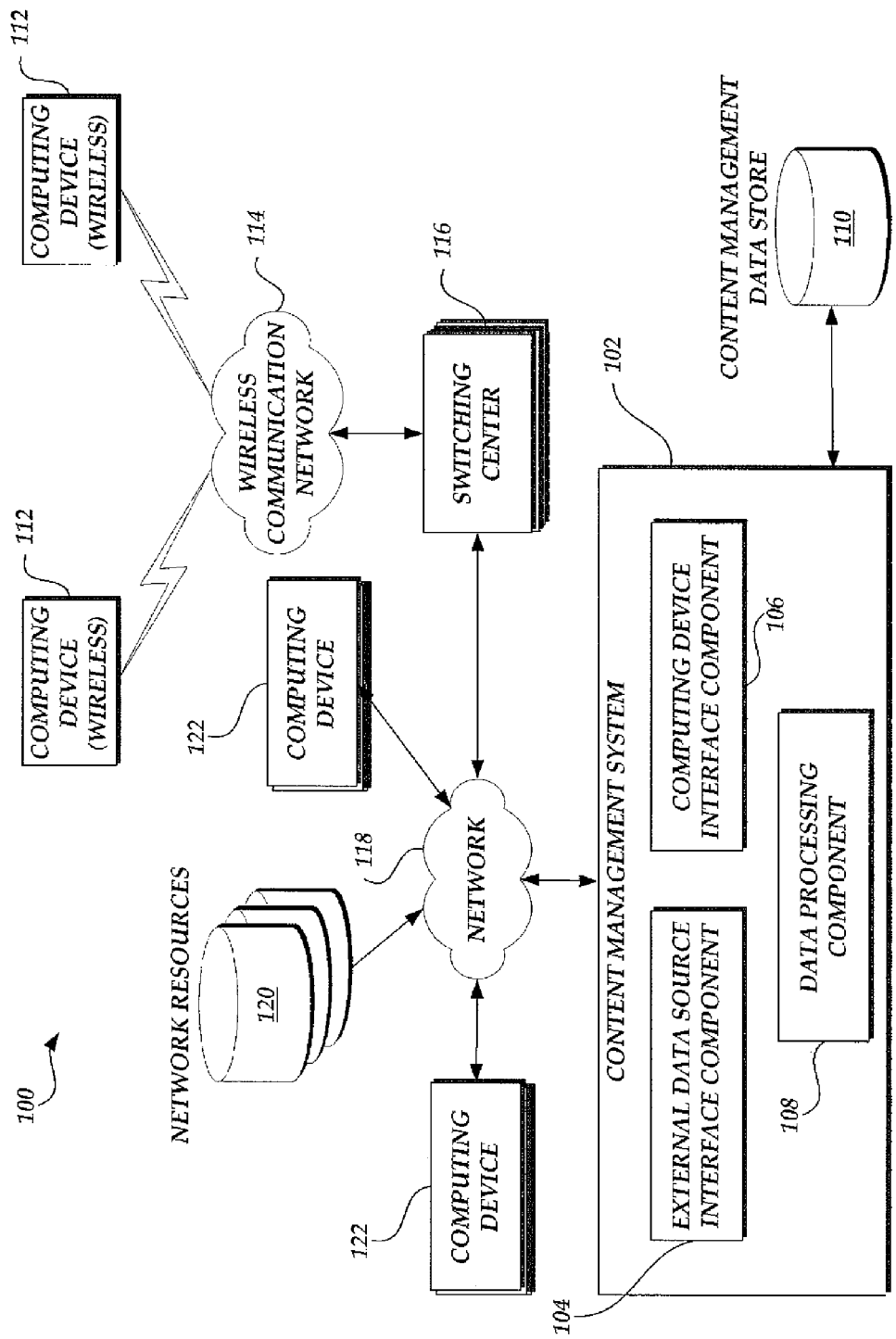
FIG. 1 is a block diagram illustrative of a content management environment for use in facilitating the sharing and processing of content access information between devices based on determination of synchronization events.

Generally described, aspects of the present disclosure relate to the management of content or information related to the content. Specifically, aspects of the present disclosure relate to sharing content access information associated with content among devices in a communication network. One or more devices collect content access information related to the presentation of content to a user each respective device (e.g., an originating device). Content can refer to any data that can be directly or indirectly accessed by a user, including, but not limited to, multi-media data, digital images, digital video, displayable text, audio data, electronic documents, electronic publications, computer-executable code, portions of the above, and the like. Additionally, the content access information is defined according to reference points, or tracking points, related to the presentation of the content originating device and can include a current state of the presentation of the content on the originating device or additional information obtained during the presentation of the content (e.g., annotations, bookmarks, excerpts, etc.). The presentation of the content will vary as a function of the capabilities and configuration of the device (e.g., a portable e-book reader vs. a mobile phone) and the format of the content (e.g., a digital publication vs. a video).

Based on a determination of a synchronization event, the originating device transmits the collected content access information, resulting in the receipt of the content access information by a content management system. The content management system can process receiving content access information from various devices and user accounts and aggregate the processed content access information into one or more ordered lists. Illustratively, the processed content access information can be aggregated in multiple manners to generate different ordered lists. Thereafter, the content management system can publish, or otherwise make available, one or more of the ordered lists to various network resources (e.g., Web sites), originating devices, or other user devices or user accounts.

As used herein, the information collected or generated by the originating device will be collectively referred to as "content access information." However, reference to "content information" does not imply any limitation as to any singular type or specific instance of content access information or any combination of content access information. Additionally, reference to "originating device," "receiving device," or "device" will not necessarily be limited to any particular type of device or to the illustrative examples of devices described herein. Further, reference to the access of content via a device as the "presentation of the content" will not necessarily be limited to any particular type or form of presentation of content (e.g., visual, aural, etc.) or as to a particular format for the content. Still further, although the term wireless device is used in this document, the term represents any type of device having a component for communicating with one or more other devices via one or more communication paths. The communication paths can include wireless communication paths (via infrared, RF, optical, terrestrial, satellite communication media, etc.), wired communication paths, or a combination thereof. Additionally, although aspects of the present disclosure will be described with regard to an illustrative communication device environment and component interactions, communication protocols, flow diagrams and interfaces, one skilled in the relevant art will appreciate that the disclosed embodiments are illustrative in nature and should not be construed as limiting.

With reference now to FIG. 1, a block diagram illustrative of a content management environment 100 for managing synchronization information related to content among a plurality of devices will be described. As illustrated in FIG. 1, content management environment 100 includes a content management system 102 for obtaining content access information transmitted from a device serving as an originating device upon determination of a synchronization event. Additionally, the content management system 102 can determine one or more devices to serve as receiving devices and cause the transmission of at least a subset of the content access information to the receiving devices.

As illustrated in FIG. 1, the content management system 102 can include an external data source interface component 104 for obtaining external information from network-based resources, such as information corresponding to a user associated with the originating device or selected receiving devices. The external data source interface component 104 may also be utilized to cause the transmission of information to one or more receiving devices. The content management system 102 can also include a device interface component 106 for obtaining content access information from various originating devices or transmitting aggregated content access information to receiving devices directly. The content management system 102 can further include a data processing component 108 for processing the content access information obtained from the originating device or devices and aggregating the processed content access information. The data processing component 108 can also determine one or more devices that will be receiving devices for specific aggregated content access information. The content management system 102 can further be associated with a content management data store 110 for storing information obtained by the interface components 104, 106 and/or utilized by the data processing component 108, as will be explained in greater detail below.

One skilled in the relevant art will appreciate that the content management system 102 may be operable on one or more computing devices, such as server computing devices. Additionally, the external data source interface component 104, device interface component 106, and data processing component 108 may be implemented in a single computing device or across multiple computing devices. Likewise, although the content management data store 110 is illustrated as local to the content management system 102, the data store 110 can correspond to a distributed data store or network based data store. One skilled in the relevant art will also appreciate that the content management system 102 may include any one of a number of additional hardware and software components that would be utilized in the illustrative computerized network environment to carry out the illustrative functions of the content management system 102 and/or any of the individually identified components.

With continued reference to FIG. 1, the content management environment 100 can include any number of computing devices 122 for presenting content to a user. The computing devices 122 can also collect and transmit synchronization information associated with the presentation of content. In an illustrative embodiment, the computing devices 122 can include various hardware or software components, or both, for obtaining and presenting digital content to a user, including, but not limited to, browser software applications, image viewing software applications, electronic publication viewing software applications, media playing software applications, and the like. The computing devices 122 can correspond to a wide variety of devices or components that are capable of initiating, receiving or facilitating communications over a communication network including, but not limited to, personal computing devices, electronic book readers, hand held computing devices, integrated components for inclusion in computing devices, consumer electronics, appliances, electronic devices for inclusion in vehicles or machinery, mobile telephones, modems, personal digital assistants, laptop computers, gaming devices, and the like. In an illustrative embodiment, the computing devices 122 include a wide variety of software and hardware components for establishing communications over one or more communication networks, including wireless communication network 114 or a wired communication network 118. Illustrative components of a computing device 122 will be described in detail with regard to FIG. 2. Additionally, as will be explained in greater detail below, one or more computing devices 122 can be associated with grouping criteria, such as geographic criteria.

As illustrated in FIG. 1, a specific subset of computing devices 122 correspond to wireless computing devices 112 that are capable of initiating, receiving or facilitating communications via a wireless communication network 114. The wireless computing devices 112 can correspond to any of the above identified devices associated with the computing devices 122. Accordingly, although computing devices 122 are illustrated as a separate component from the wireless devices 112, one skilled in the relevant art will appreciate that computing devices 122 will generally encompass all wired devices and wireless devices. Accordingly, wireless devices 112 are only illustrated in FIG. 1 as having the additional functionality of communication via a non-wireless communication network.

In an illustrative embodiment, the content management environment 100 can include a number of additional components, systems and/or subsystems for facilitating communications with the wireless devices 112 and/or the content management system 102. The additional components can include one or more mobile switching centers 116 for establishing communications with the wireless devices 112 via the wireless communication network 114, such as a cellular radio access network, a wireless network based on the family of IEEE 802.11 technical standards ("WiFi"), a wireless network based on IEEE 802.16 standards ("Wi-Max"), and other wireless networks. The operation of mobile communication networks, such as wireless communication network 114 are well known and will not be described in detail. As illustrated in FIG. 1, the mobile switching center 116 includes interfaces for establishing various communications via a communication network 118, such as the Internet, intranets, private networks and point-to-point networks, generally referred to as the "network." Although the wireless communication network 114 is illustrated as a single communication network, one skilled in the relevant art will appreciate that the communication network can be made up of any number of public or private communication networks and/or network connections.

The content management environment 100 can further include one or more network data stores 120 for providing external information to the computing devices 122, content management system 102 and a combination thereof. The external information can correspond to content, content access information, or externally referenced information. For example, a network data store 120 may be utilized to maintain and distribute content for presentation to the computing devices 122. In another example, a network data store 120 may be utilized to maintain and distribute synchronization information. In still a further example, a network data store 120 may be used to provide user information regarding devices associated with a user or user account, specific device configuration information, and/or user profile information.

Figure 2:
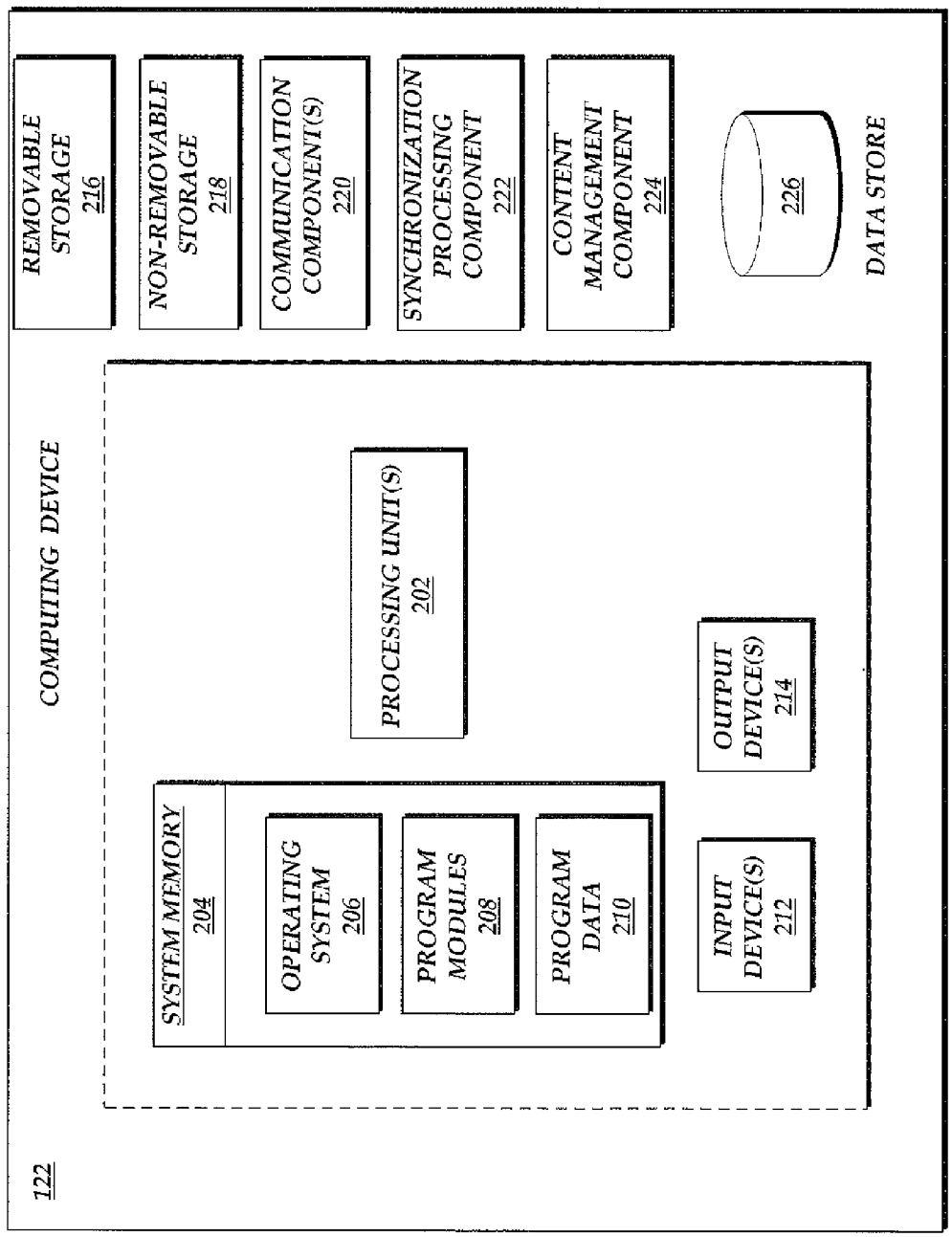
FIG. 2 is a block diagram illustrative of components of a device for use in sharing synchronization information based on a determination of a synchronization event.

With reference now to FIG. 2, illustrative components of a computing device 122 for collecting content access information and transmitting the collected content access information based on determination of a synchronization event will be described. The computing device 122 may include one or more processing units 202, such as one or more CPUs. The computing device 122 may also include system memory 204, which may correspond to any combination of volatile and/or non-volatile storage mechanisms. The system memory 204 may store information that provides an operating system component 206, various program modules 208, program data 210, and/or other components. The computing device 122 performs functions by using the processing unit(s) 202 to execute instructions provided by the system memory 204. The computing device 122 may also include one or more input devices 212 (keyboard, mouse device, specialized selection keys, etc.) and one or more output devices 214 (displays, printers, audio output mechanisms, etc.). Illustrative interfaces generated by a computing device 122, such as a wireless computing device 112, will be described below with regard to FIGS. 6-9.

With continued reference to FIG. 2, the computing device 122 may also include one or more types of removable storage 216 and one or more types of non-removable storage 218. Still further, the computing device 122 can include communication components 220 for facilitating communication via wired and wireless communication networks, such as the wireless communication network 114 and network 118 (FIG. 1). As will be explained in greater detail below, the computing device 122 can also include a synchronization processing component 222 for collecting content access information related to the presentation of content on the computing device 122. The synchronization processing component 222 may further be operative to determine synchronization events that result in the transmission of the collected content access information to the content management system 102. The synchronization events may be based on monitoring wireless device performance, obtaining inputs from users or obtaining information from external data sources.

In an illustrative embodiment, the computing device 122 may further include a content management component 224 for obtaining content access information from a device, or devices, serving as originating devices upon detection of a synchronization event. The content management component 224 can also determine one or more devices to serve as receiving devices and cause the transmission of at least a subset of the content access information to the receiving devices. Illustratively, the content management component 224 may have equivalent functionality as described with regard to the content management system 102 (FIG. 1). Alternatively, the content management component 224 may have more limited functionality or specialized functionality, such as functionality to implement peer-to-peer distribution. The computing device 122 may also be associated with a data store 226 for storing synchronization collection configuration information, synchronization event configuration information, configuration information regarding incorporation of received content access information, collected content access information, or various combinations of the above. The above enumerated list of components is representative and is not exhaustive of the types of functions performed, or components implemented, by the computing device 122. One skilled in the relevant art will appreciate that additional or alternative components may also be included in the computing device 122 to carry out other intended functions such as for an electronic book reader or a mobile telephone.

Figure 3A:
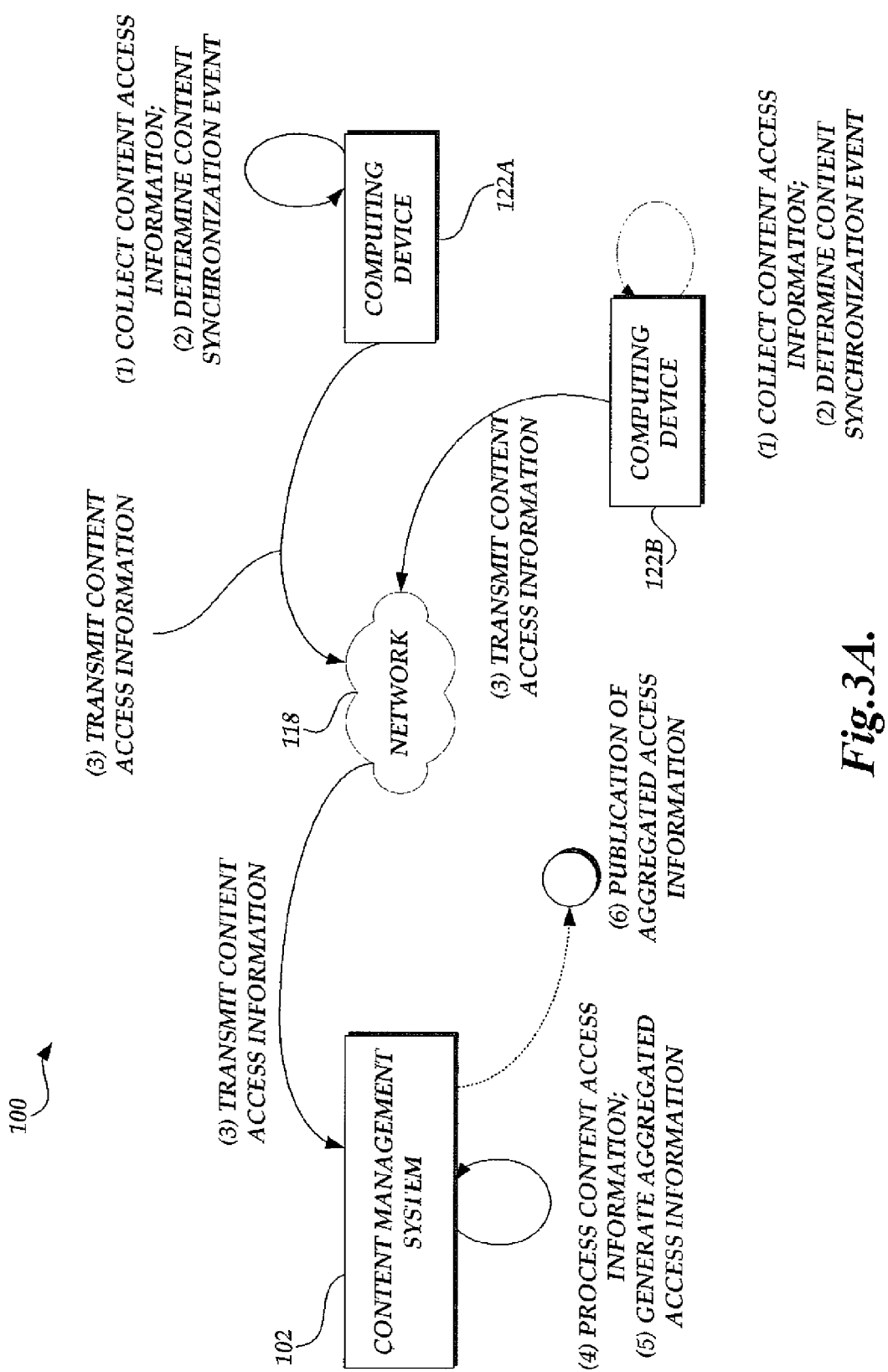
FIGS. 3A-3C are block diagrams of the content management environment of FIG. 1 illustrating various embodiments for the transmission and processing of content access information based on a determination of a synchronization event.
Figure 3B:
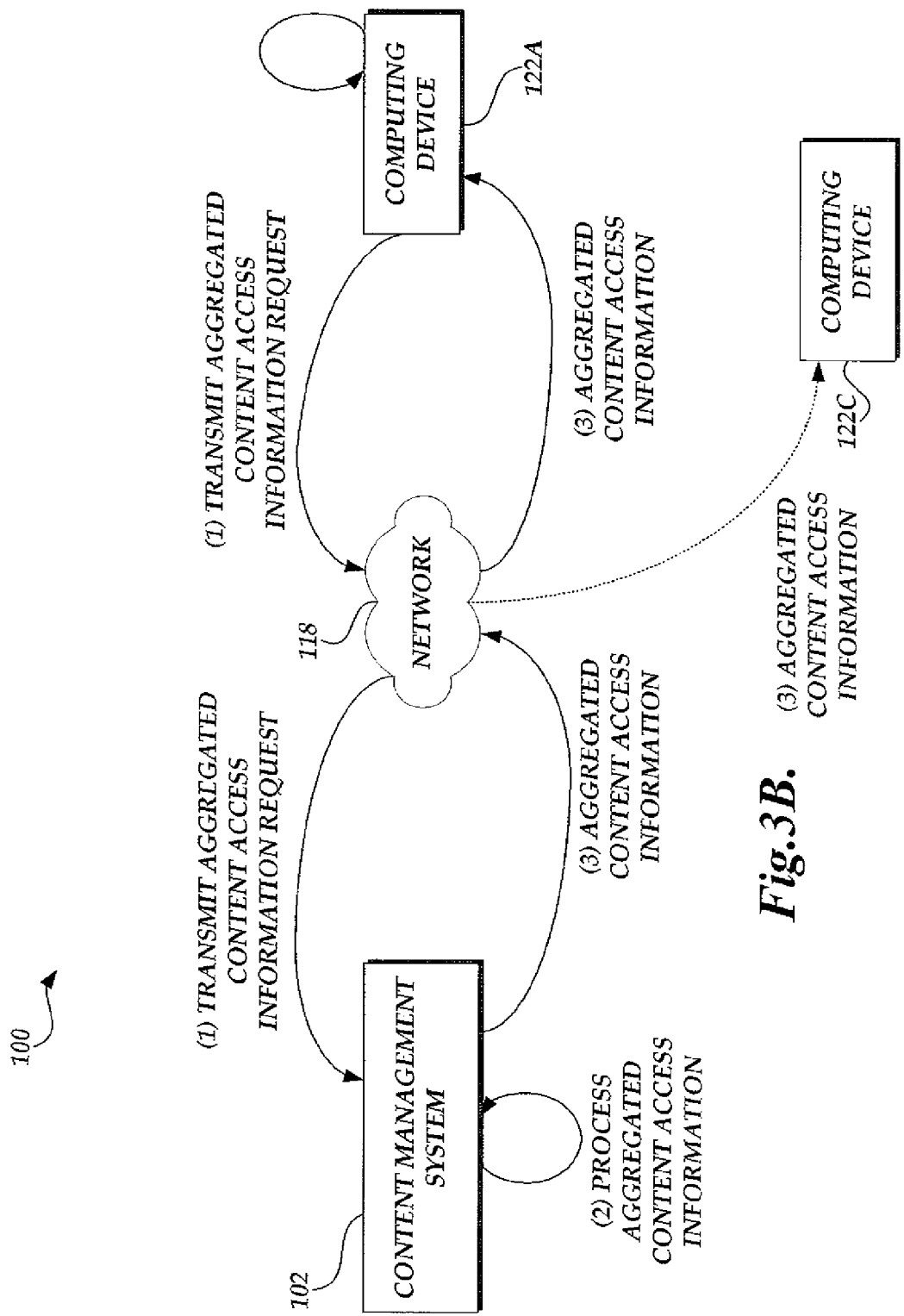
Figure 3C:
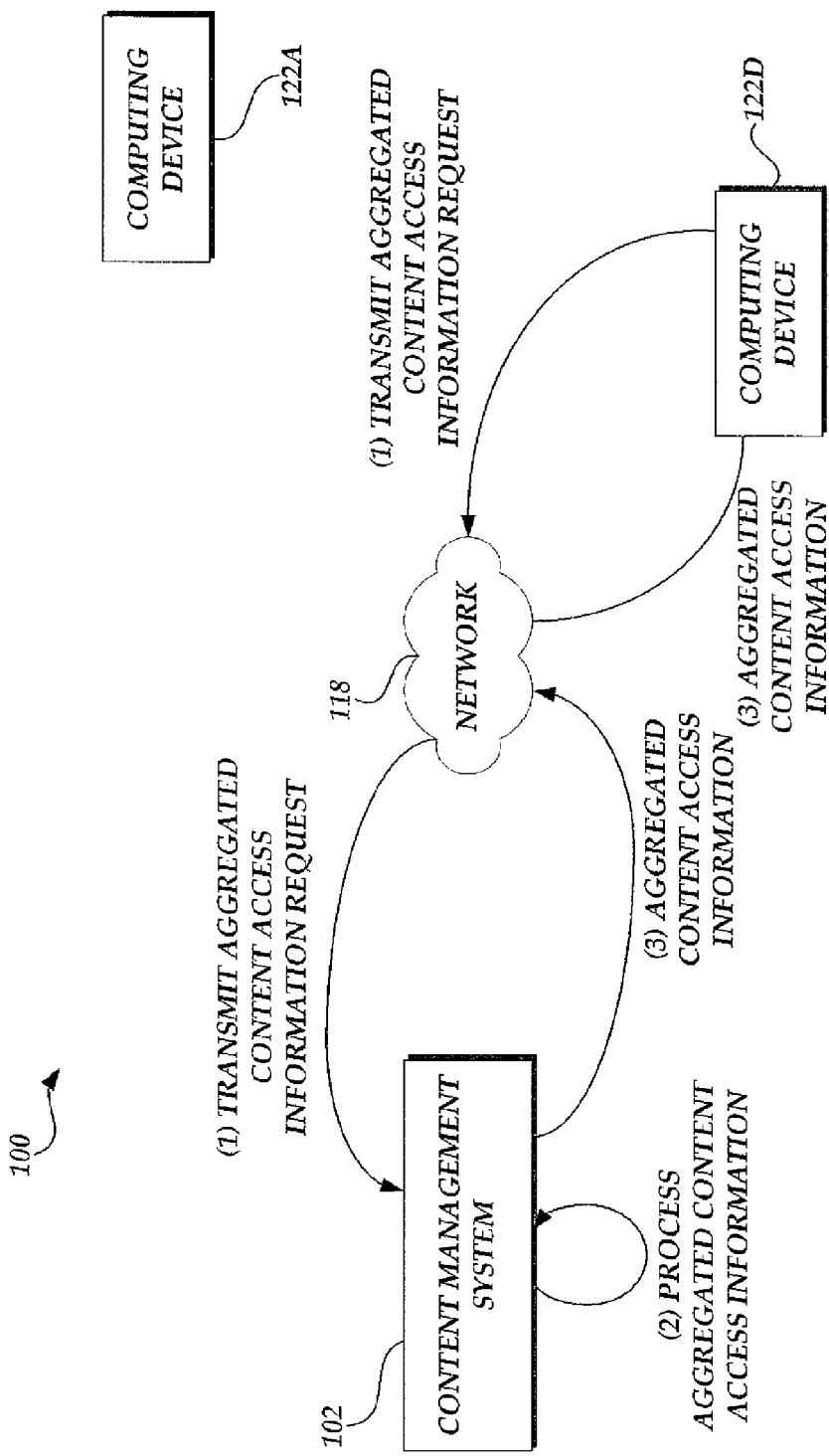

With reference to FIGS. 3A-3C, the interaction between the various components of the content management environment 100 (FIG. 1) will be described. With reference to FIG. 3A, in one embodiment, various computing devices 122A and 122B function as originating devices and collect content access information related to the presentation of content to a user, or set of users. As previously described, the content access information is defined according to one or more reference points, or tracking points, associated with the presentation of the content. For example, the content access information can correspond to information associated with the current state of the presentation of the content to the user (e.g., last page read), additional information provided by the user or an external data source (e.g., annotations, bookmarks, highlights, comments, tags, excerpts, etc.), or a combination thereof. Additionally, the content access information can be associated with various time-based information such as time of purchase, time of download, first time of access, duration of access, average time per page, and additional time-based parameters that may be appropriate for the type of content or type of content access.

In one embodiment, the originating computing devices 122A and 122B continue to collect the content access information until a synchronization event is determined. Illustratively, the synchronization processing component 222 (FIG. 2) is configured with criteria utilized to determine particular synchronization events. As previously discussed, the criteria utilized to determine synchronization events can correspond to receipt of user-initiated commands, computing device performance metrics (e.g., power levels, communication levels, motion sensors, timers, detection of input/output devices, etc.), receipt of externally provided instructions or information, and the like. Each originating computing device 122A, or class of originating computing devices, may have different configurations for determining synchronization events based on characteristics of the device (e.g., power management for a wireless computing device 112) or custom configurations provided by a user or administrator.

Upon detection of the synchronization event, the originating computing devices 122A and 122B transmit the collected content access information to the device interface component 106 of the content management system 102 via the communication network 118. The content management system 102 processes the content access information from the originating computing devices 122A and 122B. Illustratively, the processing of the content access information can include the filtering of content access information related to remove entries related to specifically identified content, to remove multiple entries to the same content, to apply minimum and maximum entry thresholds, and the like. Additionally, the processing of the content access information can include content management system 102 requesting, or otherwise receiving, information associated with the originating computing device or user account that transmitted the content access information. Examples of such information can include information from user or device profiles, externally provided information (e.g., time, geographic information), information from consumer or user databases, and the like. In some embodiments, the content access information received from the originating computing devices 122 may include at least a portion of the additional information. Additionally, in other embodiments, the content management system 102 may omit the processing of the content access information altogether.

With continued reference to FIG. 3A, the content management system 102, via the data processing component 108, generates one or more aggregated lists of content access information from the processed content access information (or just the content access information) received from originating computing devices 122. Illustratively, each separately identifiable instance an originating device 122 accesses content can be considered an access event. Accordingly, in one embodiment, the aggregation of the content access information can include the summation of all access events and the ranked ordering of content, or subsets of content, according to the number of access events.

In another embodiment, the aggregation of the content access information can include the application of one or more weighing factors to each access event and the summation of the weighed access events. In one example, the weighing factors can include a time decay factor that decreases the significance of the access event based on a comparison of the access time to a reference time (e.g., a current time). In another example, the weighing factors can include a time of access factor that adjusts the significance of the access of event based on the duration of content access (e.g., accessing the content for one page vs. accessing the content for a chapter). In a further example, the weighing factors can include a repeated content access factor that adjusts the significance of the access event if the same portion of content has been previously accessed by the same originating device. In still another example, the weighing factors can include a speed of access factor that adjusts the significance of the access event based on a rate at which the content is accessed (e.g., average page turn, playback speed, etc.). One skilled in the relevant art will appreciate that the weighing factors may be adjusted over time and may dependent on the type of content being accessed. Additional or alternative weighing factors may also be incorporated.

Illustratively, the content management system 102 can group and aggregate the content access information according to one or more characteristics associated with the content access information. Examples of the characteristics that can be associated with the content access information include, but are not limited to, content types (e.g., electronic book, printed materials, video games, audio files, video files, computer files, etc.) or computing device type/brand of the computing device that accessed the content. Additionally, the characteristics that can be associated with the content access information can include author, publisher, or distributor of the content, genre or subcategories of content, content quality ratings, content subject matter ratings (e.g., teen, adult, family, etc.), content qualifications or certifications, and the like. Still further, the characteristics that can be associated with the content access information can include user account or user profile identifiers, service provider information (e.g., Internet service provider, mobile phone service provider, etc.), geographic identifiers, time-based categories (e.g., today, last week, etc.) and the like. As will be explained below, the aggregated content to be published by the content management system 102 can be selected in accordance with one or more of the characteristics of the content access information.

Once the processed content access information has been aggregated, the content management system 102 can publish or syndicate portions of the aggregated content access information or otherwise make at least a portion of the aggregated content access information available to computing devices 122. Additionally, in other embodiments, the content management system 102 can conduct further processing of aggregated content access information. In one aspect, the content management system 102 can generate (or cause to be generated) comparisons of the aggregated content access information with other type of information, such as download information, ratings or popularity information, and the like. For example, the content management system 102 can make a comparison of the most accessed content with a "best seller" list. In other aspects, the content management system 102 can do further processing, or otherwise initiate further processing, on the aggregated content access information, such as extrapolating or interpolating the aggregated content access information, standardizing or normalizing the aggregated content access information, and the like. In still another aspect, the content management system 102 can process the aggregated content access information to facilitate the publication or syndication of the aggregated content access information, such as formatting, highlighting, or creating summaries.

With reference now to FIG. 3B, embodiments related to publication of the aggregated content access information will be described. As illustrated in FIG. 3B, in this embodiment, a computing device 122A that was an originating computing device (FIG. 3A) transmits a request to the content management system 102 for aggregated content access information. Illustratively, the request for aggregated content access information may be generated by one or more software applications on the requesting computing device 122A, such as browser software applications, electronic book reading software applications, multi-media applications, and the like. The request may include information selecting one or more characteristics of the aggregated content access information. Additionally, the request can include various security, authorization, or authentication information for establishing rights or permissions to the aggregated content access information. The aggregated content request can be transmitted in accordance with a communication protocol, such as an application protocol interface ("API").

Upon receipt of the aggregated content request, the content management system 102 processes the request to determine the aggregated content access information that is responsive to the request. As illustrated in FIG. 3B, the aggregated content access information can be transmitted to the requesting computing device 122A or to another computing device 122C on behalf of the requesting computing device 122A. In one example, a user associated with the requesting computing device 122A can request aggregated content access information that includes content access information provided by the requesting computing device. In another example, a user associated with the requesting computing device 122A may request to publish or transmit aggregated content access information that includes content access information provided by the requesting computing device, such as to a microblog network resource.

Turning now to FIG. 3C, other embodiments related to publication of the aggregated content access information will be described. As illustrated in FIG. 3C, in this embodiment, a computing device 122D that was not an originating computing device (FIG. 3A) transmits a request to the content management system 102 for aggregated content access information. As previously described, the request for aggregated content access information may be generated by one or more software applications on the requesting computing device 122D, such as browser software applications, electronic book reading software applications, multi-media applications, and the like. The request may include information selecting one or more characteristics of the aggregated content access information. Additionally, the request can include various security, authorization, or authentication information for establishing rights or permissions to the aggregated content access information. The aggregated content request can be transmitted in accordance with a communication protocol, such as an API. Upon receipt of the aggregated content request, the content management system 102 processes the request to determine the aggregated content access information that is responsive to the request.

Figure 4:
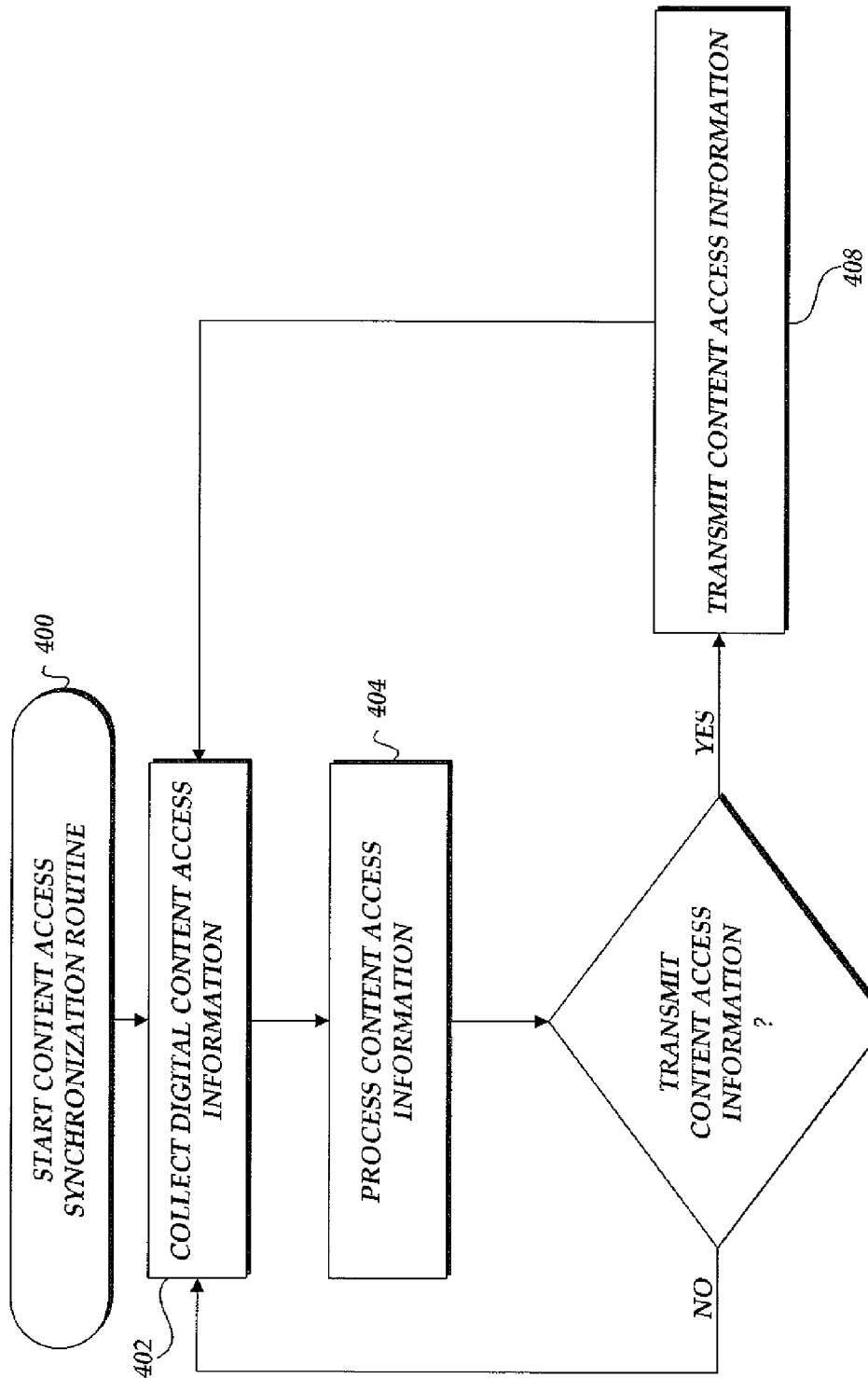
FIG. 4 is a flow diagram of a content access information generation routine implemented by a device for transmitting content access information based on a determination of a synchronization event.

With reference now to FIG. 4, a flow diagram illustrative of a content access information generation routine 400 implemented by an originating computing device 122 for transmitting content access information based on a determination of a synchronization event will be described. At block 402, the synchronization processing component 222 (FIG. 2) of the originating computing device 122 collects content access information associated with the presentation of content to a user. As previously described, the content access information can include information tracking the current state of the presentation of the content to the user (e.g., last page, paragraph, or word presented to the user), additional information provided by the user or an external data source (e.g., annotations, bookmarks, highlights, comments, tags, excerpts, etc.), or a combination thereof. For example, the additional information can include portions of previously presented content selected by a user, such as via cut and paste functionality. In another example, the additional information can include geocoding information, such as global position system (GPS) information, that can be obtained from an appropriate sensor or component and attributed to a reference point within the representation of the content.

As also described above, the content access information is illustratively defined according to reference points, or tracking points, in the content. Illustratively, the reference points or tracking points may vary according to the type and format of content, including but not limited to, chapter number, section number, page number, paragraph number, word groupings (e.g., blocks of words), word number/word count, time of play, timestamps, track number, and the like. Still further, the reference point or tracking point information may be hierarchically organized to facilitate multi-level sorting. For example, each word in a representation of content may be labeled with a word count within the content, as well as a chapter count, sentence count, etc. Illustratively, additionally, the content access information can be associated with various time-based information such as time of purchase, time of download, first time of access, duration of access, average time per page, and additional time-based parameters that may be appropriate for the type of content or type of content access.

At block 404, the synchronization processing component 222 processes the content access information. In one embodiment, the synchronization processing component 222 can process the content access information by applying filtering, spell/grammar check, and any other algorithms. Additionally, the synchronization processing component 222 can incorporate additional referenced materials, such as by accessing a URI, or incorporating information previously stored on the originating computing device 122. Still further, the synchronization processing component 222 can translate or otherwise process the collected content access information. For example, if the collected content access information corresponds to information related to the presentation of a specific representation of content (e.g., page number as viewed on a particular originating device), the synchronization processing component 222 may translate the content access information into a generic format applicable to different representations of the content or into a format specific for a different representation of the content (e.g., track information for a video or timestamp information for streaming content).

At decision block 406, a test is conducted to determine whether a synchronization event has occurred. As previously described, the synchronization processing component 222 is configured with criteria utilized to determine particular synchronization events. As previously discussed, the criteria utilized to determine the occurrence of a synchronization event can correspond to the processing of user interaction information, computing device performance metrics, externally provided instructions or information, and the like. By way of non-limiting examples, the determination of a synchronization event can correspond to a likelihood that synchronization information is available, the availability of a network connection to transmit data, the anticipated unavailability of the originating device in the future, and various combinations thereof. Additionally, examples of user interaction include, but are not limited to, selection of a power off switch or power off function, disabling a communication component, such as a wireless modem, etc., selecting a limited communication mode on the wireless device, docking a portable computing device to a computing device or power supply, and the like. One skilled in the relevant art will appreciate that the user interaction events can correspond to physical interactions with the originating computing device 122, voice or other interactive commands, remote interactions, and the like.

The computing device performance metric information can include various attributes of the originating computing device 122 including battery power information, battery power consumption rates, wireless signal strength, overall device health information, device or ambient temperature values, and the like. The performance metric information can also include information related to the status of various input or output devices or information regarding a change in status of input or output devices. For example, performance metric information can include information indicative of the connection of a portable device with a consumer device in a vehicle (e.g., via a Bluetooth wireless connection or hardwire connection). Similarly, the performance metric information can include information related to the instantiation of one or more software applications on the originating device. For example, performance metric information can include an identification of any software application having functionality to present content to a user. In an illustrative embodiment, the performance metric information may be generated by hardware components (e.g., sensors) or software components on the originating computing device 122. Additionally, the performance metric information may be obtained by the originating computing device 122 from external resources, such as attached hardware components, remote monitoring components/services or network data sources 120. For example, performance metric information can correspond to information (such as latitude and longitude information or other geographic coordinate information) from a global positioning system ("GPS") or cellular positioning system (e.g., triangulation).

Illustratively, each device, or class of devices, may have different configurations for determining synchronization events based on generic configurations of the device (e.g., power management for wireless devices) or custom configurations provided by a user or administrator. For example, a wireless computing device 112 may be configured to preserve battery consumption by limiting the number of synchronization events that can be determined.

If a synchronization event is determined at decision block 406, the originating computing device 122 transmits the content access information at block 408. In one illustrative embodiment (as discussed above with regard to FIG. 3), the computing device 122 transmits the collected content information to the content management system 102 (FIG. 1). In another embodiment, the originating computing device 122, via the content management component 224 (FIG. 2), transmits the content access information directly to other computing devices 122 in a peer distribution model. Once the synchronization information has been transmitted at block 408 or if no synchronization event is detected, the routine 400 returns to block 402. Thus, the originating computing devices 122 can continuously collect and transmit synchronization information as appropriate.

Figure 5:
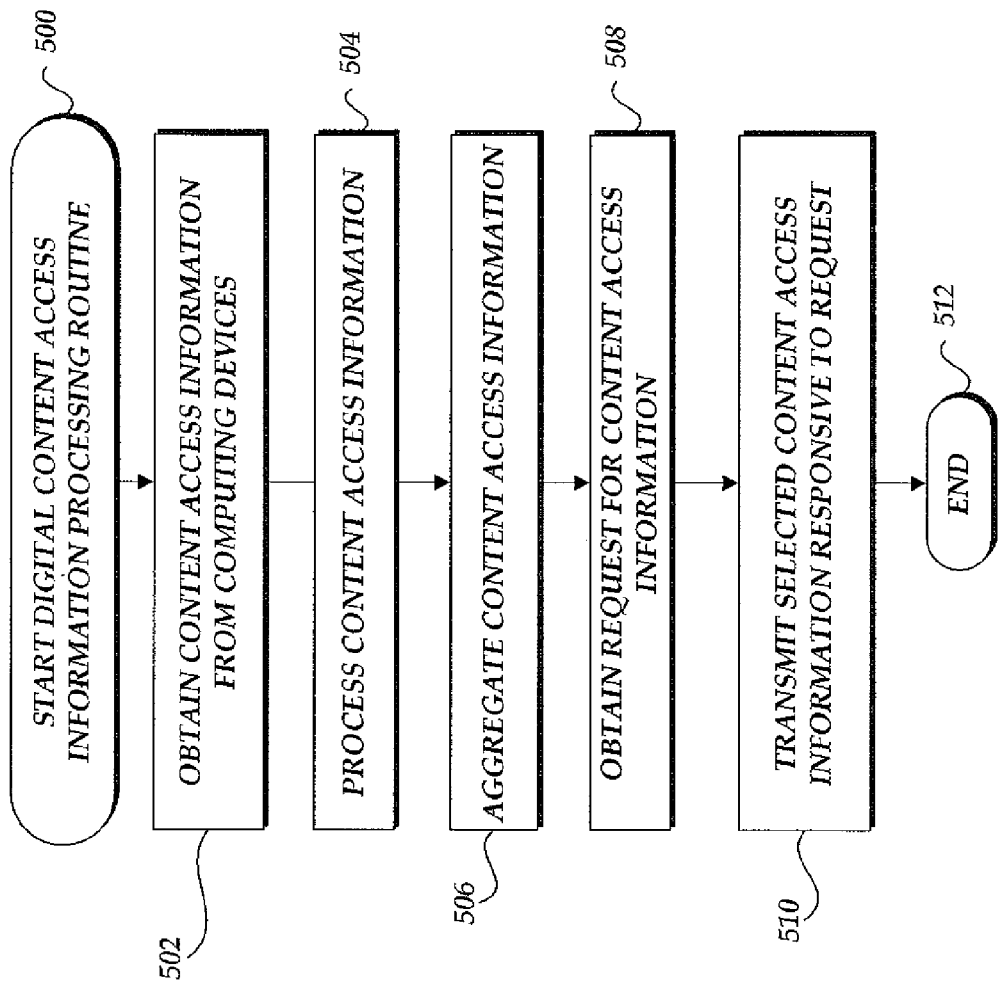
FIG. 5 is a flow diagram of a content access information processing routine implemented by a content management component for processing content access information.

With reference now to FIG. 5, a flow diagram illustrative of a content synchronization information processing routine 500 implemented by the content management system 102 (FIG. 1) for processing and aggregating content access information will be described. Although routine 500 will be described with regard to implementation by the content management system 102, one skilled in the relevant art will appreciate that at least some portion of routine 500 may be implemented by the content management component 224 as appropriate. At block 502, the device interface component 106 of the content management system 102 obtains content access information from one or more originating computing devices 122.

At block 504, the data processing component 108 processes the content access information. As previously described, the data processing component 108 can process the content access information in a variety of ways. Illustratively, the processing of the content access information can include the filtering of content access information related to remove entries related to specifically identified content, to remove multiple entries to the same content, to apply minimum and maximum entry thresholds, and the like. Additionally, the processing of the content access information can include content management system 102 requesting, or otherwise receiving, information associated with the originating computing device or user account that transmitted the content access information. Examples of such information can include information from user or device profiles, externally provided information (e.g., time, geographic information), information from consumer or user databases, and the like. In some embodiments, the content access information received from the originating computing devices 122 may include at least a portion of the additional information. Additionally, in other embodiments, the content management system 102 may omit the processing of the content access information altogether.

At block 506, the data processing component 108 aggregates the processed (or unprocessed) content access information. In an illustrative embodiment, the content management system 102 generates one or more aggregated lists of content access information from the processed content access information (or just the content access information) received from originating computing devices 122. As previously described, for purposes of aggregating content access information, each separately identifiable instance an originating device 122 accesses content can be considered an access event. Accordingly, in one embodiment, the aggregation of the content access information can include the summation of all access events and the ranked ordering of content, or subsets of content, according to the number of access events. In some embodiment, the data processing application 108 can apply minimum and maximum thresholds for including access events in the threshold.

In another embodiment, the aggregation of the content access information can include the application of one or more weighing factors to each access event and the summation of the weighed access events. In one example, the weighing factors can include a time decay factor that decreases the significance of the access event based on a comparison of the access time to a reference time (e.g., a current time). Illustratively, the time decay factor may linear according to an elapsed time or non-linear based on a customization implemented by the content management system 102. In another example, the weighing factors can include a time of access factor that adjusts the significance of the access of event based on the duration of content access (e.g., accessing the content for one page vs. accessing the content for a chapter) or an amount of content accessed.

In a further example, the weighing factors can include a repeated content access factor that adjusts the significance of the access event if the same portion of content has been previously accessed by the same originating device. In still another example, the weighing factors can include a speed of access factor that adjusts the significance of the access event based on a rate at which the content is accessed (e.g., average page turn, playback speed, game play time, etc.). In still a further example, the weighing factor can include a ratio of various time-based inputs, such as a ratio of time of purchase/download to time of first access, a ratio of time of first access to time of completion, and the like. One skilled in the relevant art will appreciate that the weighing factors may be adjusted over time and may dependent on the type of content being accessed. Additional or alternative weighing factors may also be incorporated.

With continued reference to block 506, the content management system 102 can group and aggregate the content access information according to one or more characteristics associated with the content access information, the device(s) or software used to access the content (or otherwise generate the content access information), and one or more users associated with a device or account. Examples of the characteristics that can be associated with the content access information include, but are not limited to, content types (e.g., electronic book, printed materials, video games, audio files, video files, computer files, etc.) or computing device type/brand of the computing device that accessed the content. Additionally, the characteristics that can be associated with the content access information can include author, publisher, or distributor of the content, genre or subcategories of content, content quality ratings, content subject matter ratings (e.g., teen, adult, family, etc.), content qualifications or certifications, and the like. Still further, the characteristics that can be associated with the content access information can include user account or user profile identifiers, service provider information (e.g., Internet service provider, mobile phone service provider, etc.), geographic identifiers, time-based categories (e.g., today, last week, etc.) and the like. As will be explained below, the aggregated content to be published by the content management system 102 can be selected in accordance with one or more of the characteristics of the content access information.

At block 508, the content management system 102, such as through the computing system interface component 106 (FIG. 1), obtains a request for aggregated content access information. As previously described with regard to FIGS. 3B and 3C, the content management system 102 can receive requests for aggregated content access information from a variety of computing devices 122. As previously described, the request may include information selecting one or more characteristics of the aggregated content access information. Additionally, the request can include various security, authorization, or authentication information for establishing rights or permissions to the aggregated content access information. The aggregated content request can be transmitted in accordance with a communication protocol, such as an API.

At block 510, the content management system 102, such as through the computing system interface component 106 (FIG. 1), transmits content access information responsive to the request. Illustratively, the transmission of the aggregated content information may include the generation of user interfaces, screen displays, and other interactive media. Additionally, the transmission of the aggregated content information can include the publication or transmission of information utilized by network resources or network based services, such as via an API. As previously described, the content management system 102 can conduct further processing of aggregated content access information. In one aspect, the content management system 102 can generate (or cause to be generated) comparisons of the aggregated content access information with other type of information, such as download information, ratings or popularity information, and the like. In other aspects, the content management system 102 can do further processing, or otherwise initiate further processing, on the aggregated content access information, such as extrapolating or interpolating the aggregated content access information, standardizing or normalizing the aggregated content access information, and the like. In still another aspect, the content management system 102 can process the aggregated content access information to facilitate the publication or syndication of the aggregated content access information, such as formatting, highlighting, or creating summaries. At block 512, the routine 500 terminates.

With reference now to FIGS. 6-9, various screen displays or user interfaces for facilitating the display and publication of aggregated content access information will be described. One skilled in the relevant art will appreciate, however, that the disclosed screen displays or user interfaces are illustrative in nature and should not be construed as limiting. Additionally, although various embodiments or combinations of aggregated content access information are described as contained within the same screen display, one skilled in the relevant art will appreciate that the aggregated content access information can be generated on multiple screen displays.

Figure 6:
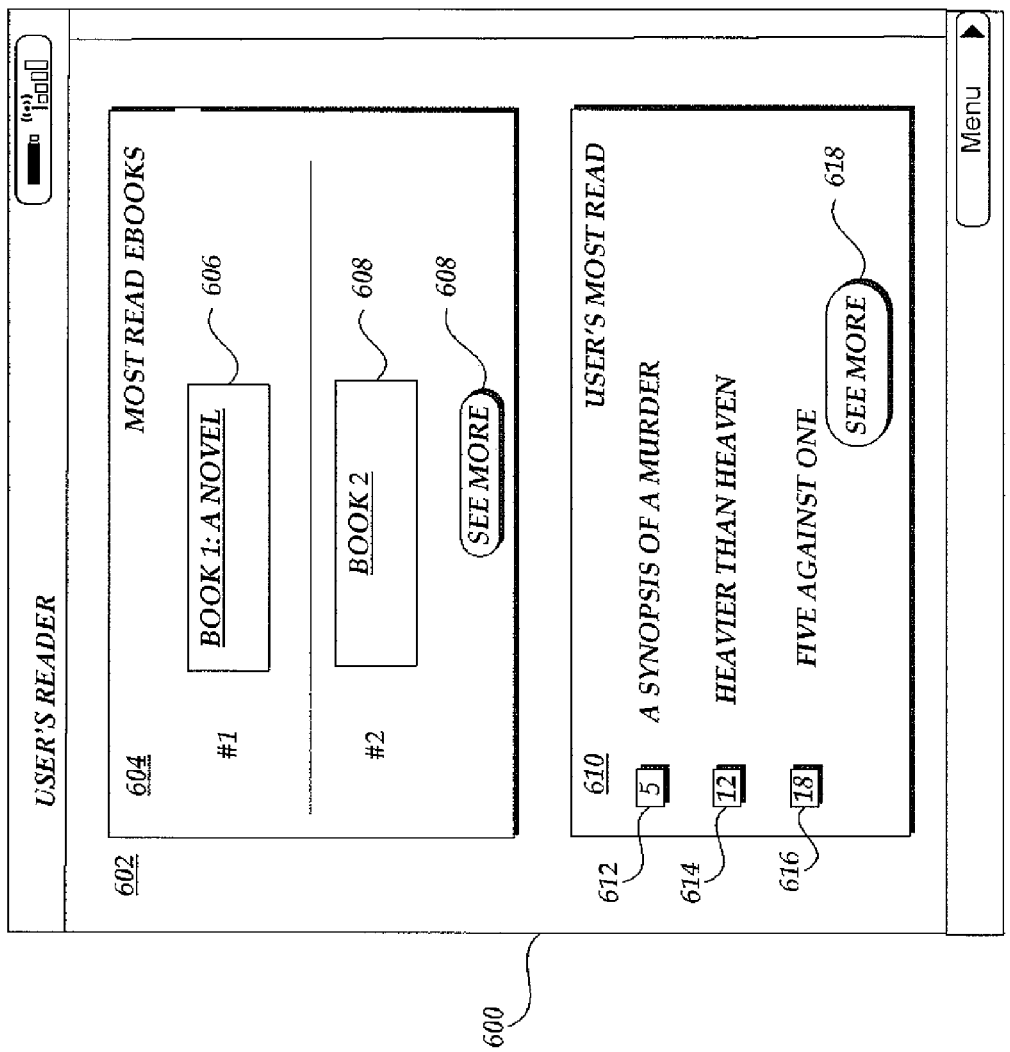
FIG. 6 is an illustrative interface generated on a wireless device for displaying various embodiments of aggregated content access information.

With reference to FIG. 6, an illustrative interface 602 generated on a wireless device 600 for displaying aggregated content access information will be described. The interface 602 includes a first portion 604 for displaying an ordered list of electronic book reader content. Specifically, the aggregated content in portion 604 corresponds to aggregated content access associated with all electronic book readers or electronic book reader applications implemented on a computing device. Portion 604 identifies that top two most accessed content (perhaps within a defined time window), generally represented at 606 and 608. The identification of the content can include controls for facilitating the purchase or download of the identified content if such identified content is not already accessible to the particular computing device as well as a control 608 for obtaining more of the aggregated content access list.

The interface 602 also includes a second portion 610 for displaying a different ordered list of electronic book reader content. Specifically, the aggregated content in portion 610 corresponds to a comparison of aggregated content access associated with a larger subset of electronic book readers and content accessed only by the particular user account or particular electronic book reader. Portion 610 identifies the three top recommended pieces of content to the user, generally represented at 612, 614, 616. Additionally, 612, 614, 616 can also include an identification of their respective order in the larger subset of aggregated content access information (e.g., all electronic book readers). Portion 610 can also include a control 618 for obtaining more of this particular aggregated content access list.

Figure 7:
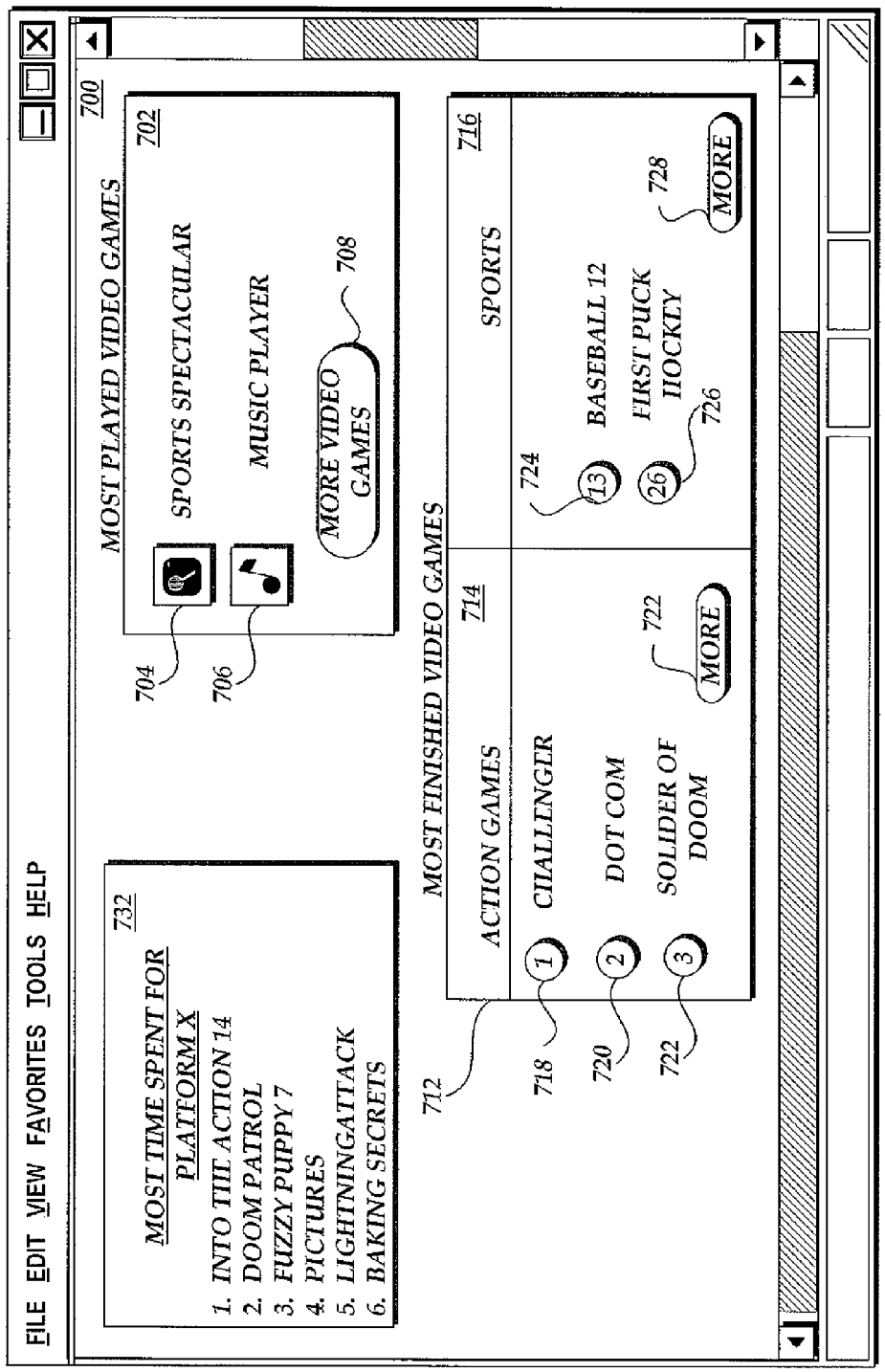
FIG. 7 is an illustrative display associated with a consumer device for displaying various embodiments of aggregated content access information.

With reference to FIG. 7, an illustrative interface 700 generated on a computing device for displaying aggregated content access information will be described. The interface 700 includes a first portion 702 for displaying an ordered list of video game content. Specifically, the aggregated content access list in portion 702 corresponds to content access associated with all most played video games. Portion 702 identifies that top two most accessed video games (perhaps within a defined time window), generally represented at 704 and 706. The identification of the content can include controls for facilitating the purchase or download of the identified content if such identified content is not already accessible to the particular computing device as well as a control 708 for obtaining more of the aggregated content access list.

The screen interface 700 also includes a portion 712 for displaying different aggregated content access information. Specifically, the aggregated content access list in portion 712 includes two subsets of aggregated content access information related to most finished video game content. The first subset 714 relates to video game content corresponding to action game genre and the second subset relates to video game content corresponding to sports genre. The first subset 714 identifies the top three video game content related to the action games genre, generally at 718, 720, 722. As similarly described above, the identification of the content can include controls for facilitating the purchase or download of the identified content if such identified content is not already accessible to the particular computing device as well as a control 722 for obtaining more of the aggregated content access list. The second subset 716 identifies that top two video game content related to the sports genre, generally at 724, 726. Additionally, the identification of the top two video game content also includes additional information identifying an ordered placement for a larger subset of video game content, such as an aggregated list of the most finished video games (irrespective of genre). The identification of the content can include controls for facilitating the purchase or download of the identified content if such identified content is not already accessible to the particular computing device as well as a control 728 for obtaining more of the aggregated content access list.

With continued reference to FIG. 7, the screen interface 700 can include another portion 732 for displaying different aggregated content access information. Specifically, the aggregated content access list in portion 732 includes aggregated content access information related to most time spent for particular type of computing device 122. In this example, portion 732 includes an ordered listing of the six top entries of the aggregated content access list and does not include any type of controls for purchasing or ordering the content or for obtaining additional listings.

Figure 8:
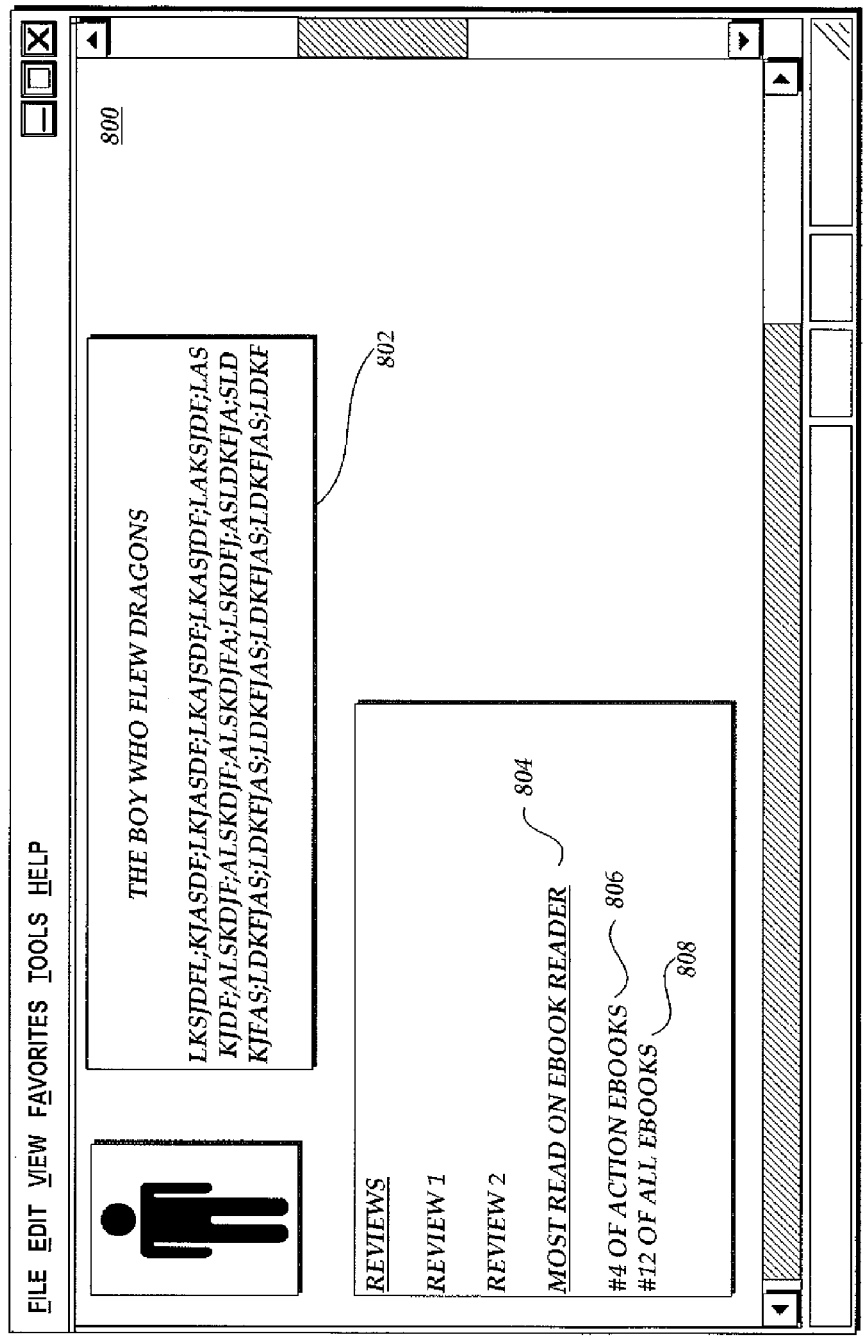
FIG. 8 is an illustrative display associated with a consumer device for displaying various embodiments of aggregated content access information.

Turning now to FIG. 8, another illustrative interface 800 generated on a computing device for displaying aggregated content access information will be described. The interface 800 includes a first portion 802 for displaying information about a selected item, such as from a commerce Web site. The first portion can include various types of multi-media information, include textual and graphical information. The interface 800 also includes a second portion 804 that identifies one or more entries for the specified item in an aggregated content list. As illustrated in FIG. 8, portion 804 includes an entry 806 that the selected item was ranked fourth in an aggregated content access list of electronic books associated with an action genre. Portion 804 also include an entry 808 that the selected item was ranked twelfth in an aggregated content access list of all electronic books.

Figure 9A:
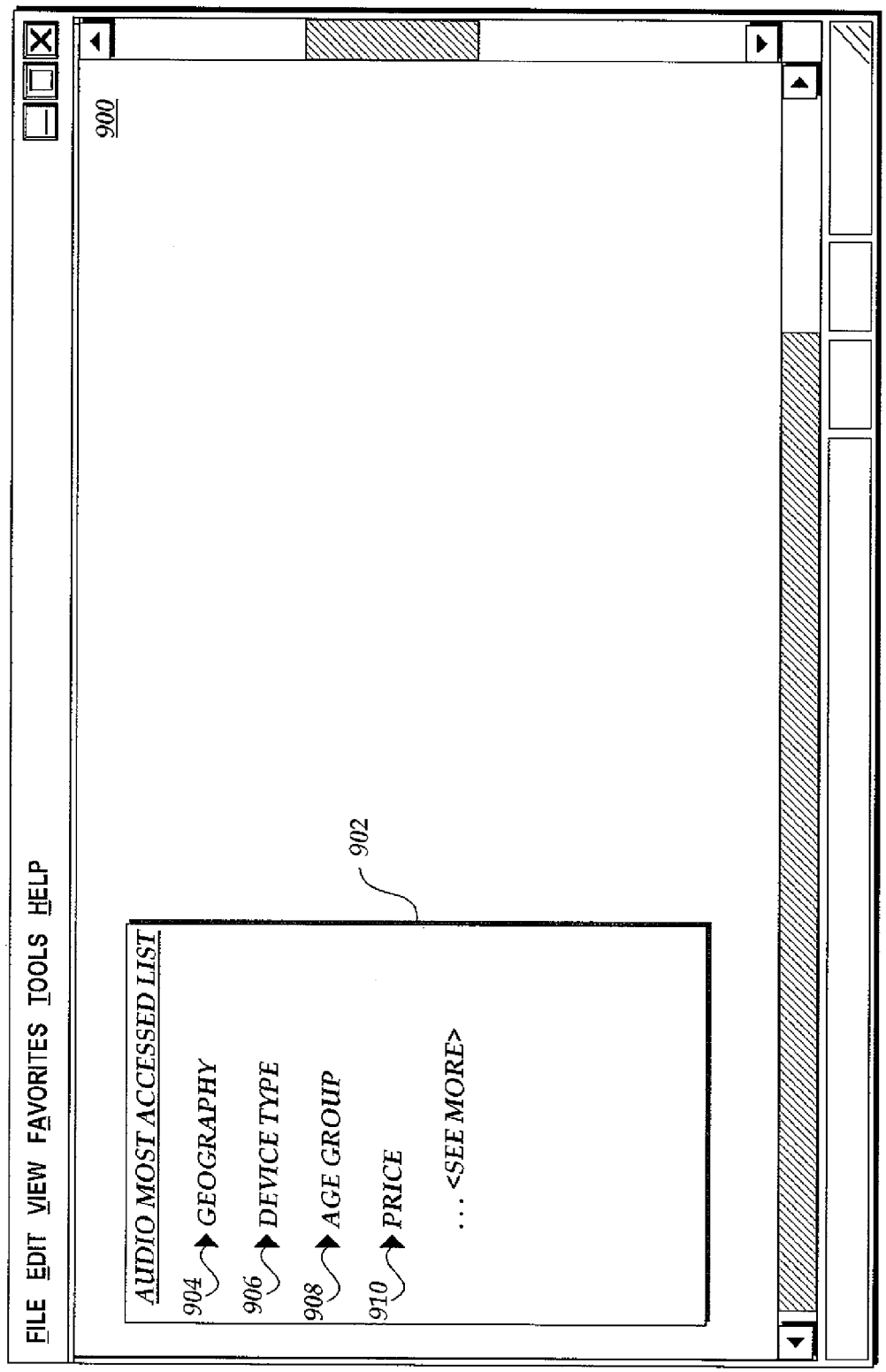
FIGS. 9A and 9B are illustrative interfaces generated on a consumer device for displaying various embodiments of aggregated content access information.
Figure 9B:
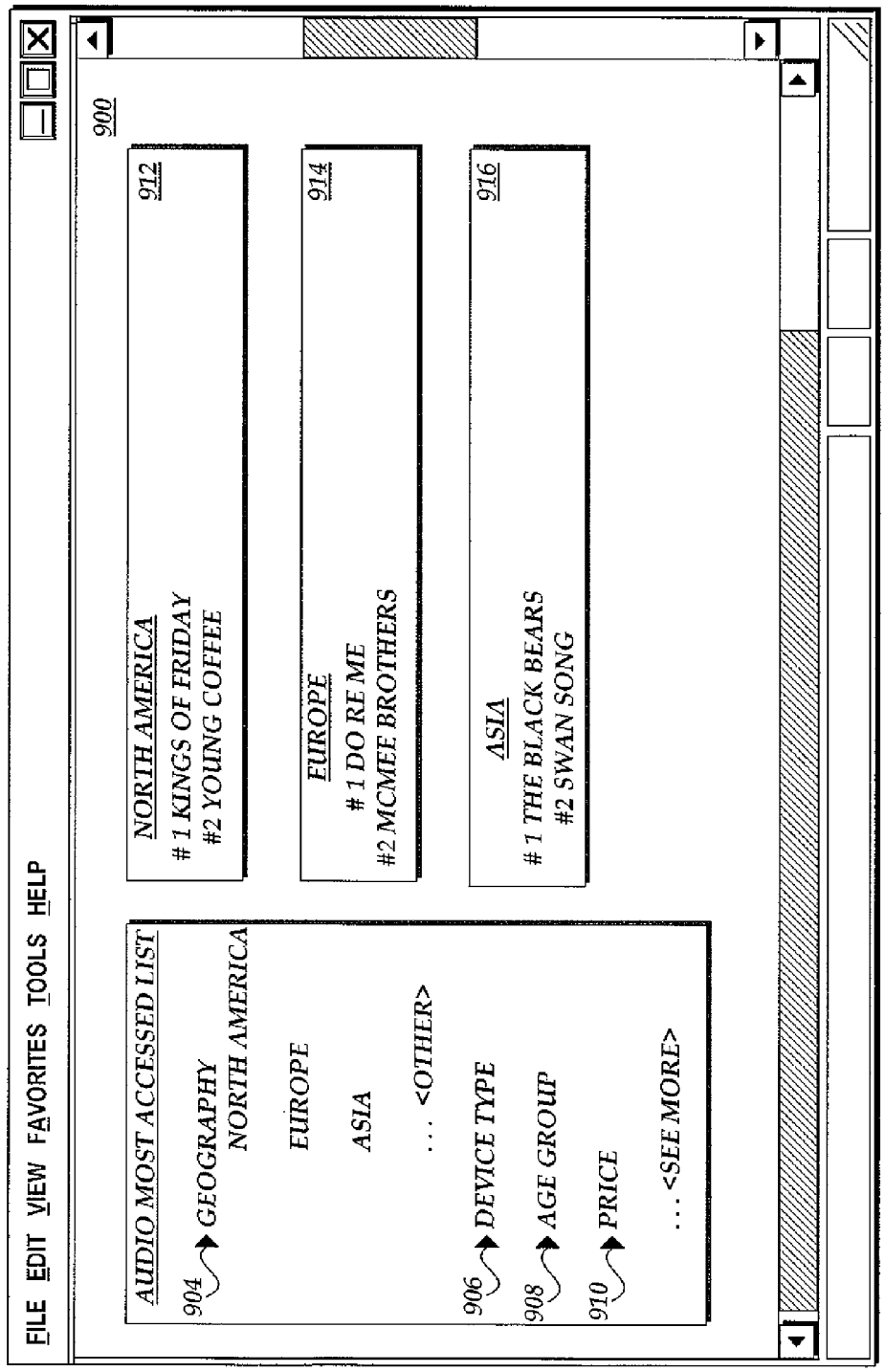

With reference now to FIGS. 9A and 9B, a further illustrative interface 900 generated on a computing device for displaying aggregated content access information will be described. As previously described, in some embodiments, an interface may be provided that allows for a user to specify one or more characteristics of content that will be used to identify potentially relevant aggregated content access lists. As illustrated in FIG. 9A, a screen display can include, among other portions, a portion 902 that includes an identification of one or more potential characteristics of content that can be selected by a user. Specifically, in this example, portion 902 includes controls for allowing the selection of geography 904, device type 906, age group 908 or price 910 as potential characteristics of the aggregated content access list.

With reference to FIG. 9B, by way of illustrative example, a selection of a control, such as geography control 904, results in the presentation of potentially additional subcategories, such as North America, Europe, Asia, etc., which may be further selectable. Additionally, the screen display 900 can include additional portions that identify an ordered list of aggregated content access information according to the subcategories. Specifically, the screen display can include a portion 912 for an ordered list identifying content access information for North America, a portion 914 for an ordered list identifying content access information for Europe, and a portion 916 for an ordered list identifying content access information for Asia.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing,
content access information of a plurality of devices, the
  content access information related to presentation content on each of the respective plurality of devices, the system comprising
one or more processors configured to implement functional components, the functional components including at least:
an interface component of the system that is operative to:
obtain content access information from a plurality of computing devices,
the content access information including a plurality of access events and corresponding to presentation of the content,
wherein the content access information is defined according to a sequential set of reference points, wherein the reference points are at least one of chapter numbers, section numbers, page numbers, paragraph numbers, word groupings, word count, or track numbers, and
wherein the content access information define a state of presentation of the content in accordance with a reference point and the content access information including a number of access events; and
a data processing component of the system that is operative to:
process the content access information by
obtaining at least one external information and a user profile information associated with the obtained content access information,
wherein the at least one external information is a time based information or a geographic information,
filtering the content access information, wherein the filtering includes
removing content access information having a number of access events below a defined threshold and removing multiple entries of the same content; and
aggregate the processed content access information by
applying one or more weighing factors to each of the access events and according to one or more characteristics of the content access information,
wherein the one or more weighing factors are based, at least in part, on an amount of content accessed and the rate at which the amount of content is accessed; and
wherein the one or more characteristics includes a type of computing device accessing the content; and
generating an ordered list based on a summation of the access events multiplied by the weighing factor and according to the one or more characteristics;
an interface component of the system that is operative to:
obtain a request for aggregated content access information,
in response to the request, transmit the aggregated content access information.

2. The system as recited in claim 1, wherein the filtering further includes removing content access information associated with a set of one or more identified content.

3. The system as recited in claim 1, wherein the one or more characteristics further include information associated with a service provider identifier.

4. The system as recited in claim 1, wherein the one or more characteristics further include information associated with a type of content.

5. The system as recited in claim 1, wherein the one or more characteristics further include information associated with at least one of a user or user account.

6. The system as recited in claim 1, wherein the one or more characteristics further include information associated with geographic information.

7. The system as recited in claim 1, wherein the one or more characteristics further include information associate with time based information.

8. The system as recited in claim 1, wherein the one or more weighing factors are associated with a time decay factor, the time decay factor related to a time of access compared to a current time.

9. The system as recited in claim 1, wherein the one or more weighing factors are associated with time of access factor, the time of access factor related to a duration of content access.

10. The system as recited in claim 1, wherein the one or more weighing factors are associated with a duration of time of first access to time of download.

11. The system as recited in claim 1, wherein the one or more weighing factors are associated with an access factor, the access factor related to a total amount of content access.

12. The system as recited in claim 1 further comprising processing the aggregated content access information.

13. The system as recited in claim 12, wherein processing the aggregated content access information includes comparing the aggregated content access information with additional information.

14. The system as recited in claim 12, wherein processing the aggregated content access information includes at least one of extrapolating the aggregated content access information, interpolating the aggregated content access information, normalizing the aggregated content access information, and standardizing the aggregated content access information.

15. A method for managing content access information of a plurality of devices, the content access information related to presentation content on each of the respective plurality of devices,
the method comprising:
obtaining content access information from a plurality of computing devices,
the content access information including a plurality of access events and corresponding to presentation of the content,
wherein the content access information is defined according to a sequential set of reference points, wherein the reference points are at least one of chapter numbers, section numbers, page numbers, paragraph numbers, word groupings, word count, or track numbers, and
wherein the content access information define a state of presentation of the content in accordance with a reference point and the content access information including a number of access events; and
processing the content access information by
obtaining at least one external information and a user profile information associated with the obtained content access information,
wherein the at least one external information is a time based information or a geographic information,
filtering the content access information, wherein the filtering includes removing content access information having a number of access events below a defined threshold and removing multiple entries of the same content; and aggregating the processed content access information by applying one or more weighing factors to each of the access events and according to one or more characteristics of the content access information, wherein the one or more weighing factors are based, at least in part, on an amount of content accessed and the rate at which the amount of content is accessed, and wherein the one or more characteristics includes a type of computing device accessing the content; and generating an ordered list based on a summation of the access events multiplied by the weighing factor and according to the one or more characteristics;

obtaining a request for aggregated content access information, in response to the request, transmit the aggregated content access information.

16. The method as recited in claim 15, wherein the filtering further includes removing content access information associated with a set of one or more identified content.

17. The method as recited in claim 15, wherein the one or more characteristics further include information associated with a service provider identifier.

18. The method as recited in claim 15, wherein the one or more characteristics further include information associated with a type of content.

19. The method as recited in claim 15, wherein the one or more characteristics further include information associated with at least one of a user or user account.

20. The method as recited in claim 15, wherein the one or more characteristics further include information associated with geographic information.

21. The method as recited in claim 15, wherein the one or more characteristics further include information associate with time based information.

22. The method as recited in claim 15, wherein the one or more weighing factors are associated with a time decay factor, the time decay factor related to a time of access compared to a current time.

23. The method as recited in claim 15, wherein the one or more weighing factors are associated with time of access factor, the time of access factor related to a duration of content access.

24. The method as recited in claim 15, wherein the one or more weighing factors are associated with a duration of time of first access to time of download.

25. The method as recited in claim 15, wherein the one or more weighing factors are associated with an access factor, the access factor related to a total amount of content access.

26. The method as recited in claim 15 further comprising processing the aggregated content access information.

27. The method as recited in claim 26, wherein processing the aggregated content access information includes comparing the aggregated content access information with additional information.

28. The method as recited in claim 26, wherein processing the aggregated content access information includes at least one of extrapolating the aggregated content access information, interpolating the aggregated content access information, normalizing the aggregated content access information, and standardizing the aggregated content access information.

* * * * *